United States Patent
Paul et al.

(10) Patent No.: US 9,862,891 B2
(45) Date of Patent: Jan. 9, 2018

(54) BIOMASS-DERIVED WASTE TO LOW DURENE FUELS

(71) Applicant: PHILLIPS 66 COMPANY, Houston, TX (US)

(72) Inventors: Uchenna P. Paul, Edwardsville, IL (US); Jianhua Yao, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 0 days.

(21) Appl. No.: 15/433,569

(22) Filed: Feb. 15, 2017

(65) Prior Publication Data

US 2017/0240817 A1    Aug. 24, 2017

Related U.S. Application Data

(60) Provisional application No. 62/299,354, filed on Feb. 24, 2016, provisional application No. 62/299,347, filed on Feb. 24, 2016.

(51) Int. Cl.
*C07C 1/20* (2006.01)
*C07C 1/24* (2006.01)
*C10G 3/00* (2006.01)
*C10L 1/06* (2006.01)

(52) U.S. Cl.
CPC ............ *C10G 3/49* (2013.01); *C10L 1/06* (2013.01); *C10G 2300/202* (2013.01); *C10G 2400/02* (2013.01); *C10L 2200/0469* (2013.01); *C10L 2270/023* (2013.01)

(58) Field of Classification Search
CPC ................................ C07C 1/20; C07C 1/24
USPC ..... 585/638, 639, 640, 469, 733; 208/16, 17
See application file for complete search history.

(56) References Cited

U.S. PATENT DOCUMENTS 4,480,145 A * 10/1984 Brennan ............... C07C 1/20
502/77

* cited by examiner

*Primary Examiner* — Thuan D Dang
(74) *Attorney, Agent, or Firm* — Phillips 66 Company

(57) ABSTRACT

The present invention relates to processes for converting a feedstream comprising predominantly light alcohols into liquid transportation fuels in the gasoline boiling range. In certain embodiments, the feedstream is a bio-waste stream derived from the conversion of sorbitol or glycerol to propanediol.

5 Claims, No Drawings

BIOMASS-DERIVED WASTE TO LOW DURENE FUELS

STATEMENT REGARDING FEDERALLY SPONSORED RESEARCH OR DEVELOPMENT

This application is a non-provisional application which according to 35 U.S.C. §119(e), claims the benefit of, and the right of priority to, U.S. Provisional Application Ser. No. 62/299,354 filed Feb. 24, 2017, entitled "Converting Bio-waste to Gasoline," and U.S. Provisional Application Ser. No. 62/299,347 filed Feb. 24, 2017, entitled "Bio-waste to Low Durene Fuels", both of which are incorporated herein in their entirety, as permitted under 37 CFR 1.57(b).

FIELD OF THE INVENTION

The present invention relates to processes for converting a biomass-derived waste stream comprising predominantly light alcohols into liquid transportation fuels

BACKGROUND

Propanediol is mainly used as a building block in the production of polymers. There are several industrialized processes for the production of propanediol. One of the newly developed processes involves hydrogenolysis of sugar alcohol, such as sorbitol. This process produces a desired product, propanediol, as well as a waste stream containing various oxygenates. In the interest of increasing the yield of value-added products from biomass, it would be beneficial to discover useful processes for converting this waste stream to value-added commercial products.

BRIEF SUMMARY

Certain embodiments of the present invention provide a process for upgrading a feedstream comprising light alcohols to a liquid transportation fuel, comprising: a) providing a feedstream comprising at least 70 wt % of mono-functional alcohols having from 1-3 carbons; b) reacting the feedstream over a ZSM-5 zeolite catalyst at a temperature and pressure suitable to produce a hydrocarbon product in the gasoline boiling-range comprising at least 60 wt % of compounds comprising at least five carbons and a research octane rating of at least 95.

Certain embodiments further comprise co-feeding ethylene during the reacting, thereby decreasing the quantity of durene formed during the reacting.

In certain embodiments, the feedstream is a waste stream derived from a process for converting at least one of bio-derived glycerol and sorbitol to propanediol.

DETAILED DESCRIPTION

The present inventive process comprises a way to produce a gasoline range hydrocarbons stream from a bio-waste stream comprising light alcohols and ethylene stream by using H-ZSM-5 based catalyst. This bio-waste stream is derived from a conversion process in which sorbitol/glycerol from biomass hydrolysis is converted to a desired product of propanediol and a biomass-derived waste stream comprising mainly light mono-functional alcohols.

However, we have found that co-feeding ethylene during the upgrading reaction effectively reduces durene concentration by nearly 50% in the gasoline product without significantly affecting octane rating of the produced liquid transportation fuel. This prevents durene precipitation at low temperatures and allows blending of a higher percentage of the product into transportation fuels.

Others have utilized durene isomerization reactors to reduce the final concentration of durene in the biomass-derived fuels. The present process may eliminate the need for such reactors (resulting in a savings of CAPEX and OPEX) by simply co-feeding ethylene during the zeolite upgrading of the light alcohol stream.

In certain embodiments, the feedstream of light alcohols is derived from a bio-waste stream that remains after the conversion of a biomass-derived stream predominantly comprising glycerol or sorbitol to value added products such as propanediol. Propanediol has commercial value as a building block in the production of polymers. There are several industrialized processes for the production of propanediol. However, hydrogenolysis of sorbitol or glycerol results in a bio-waste stream with the composition listed in Table 1

TABLE 1

Composition of Biomass-derived waste Stream

| Compound | wt % |
| --- | --- |
| Methanol | 50-80 |
| Ethanol | 5-10 |
| i-Propanol | 4-10 |
| 1-Propanol | 0.1-2 |
| 2-Butanol | 0.01-1 |
| 3-Methylcyclopentanol | 0.1-3 |
| Acetone | <0.1 |
| Acetic Acid | <0.01 |
| Water | 5-30 |

The following examples are intended to be illustrative of specific embodiments in order to teach one of ordinary skill in the art how to make and use the invention. It is not intended that the scope of the invention be limited to the disclosed embodiments, but rather, the full scope of the appended claims.

EXAMPLE 1

Conversion of Light Alcohols to Distillate:

HZSM-5 catalyst bound with 30% $Al_2O_3$ was utilized to convert methanol at 350° C. and 300 psig. Gasoline range hydrocarbons containing 64% aromatics, 23% iso-paraffins, 6% naphthenes and 2% unidentified hydrocarbons were obtained. However, the content of durene in the liquid hydrocarbons was more than 20%. The quantity of C11-14 hydrocarbons in the oil product were about 6%. A large amount of solid deposits blocked the effluent tube from the reactor outlet to the condenser, and the main component of these deposits was durene. The conversion of methanol under the above reaction conditions was close to 100%. Organic oxygenates in aqueous phase products were below 1%. It is clear that the catalyst is active for gasoline production from methanol, but likely not effective for distillate production. This is mainly due to the medium pore (5.3×5.6 Å, 5.1×5.5 Å) structure of HZSM-5. The high formation of durene on this catalyst also was deemed to limit its application in the conversion of light alcohols to gasoline-range products.

EXAMPLE 2

Conversion was performed using the same catalyst as in Example 1. Five grams of H-ZSM5 catalyst was utilized for each run at a temperature of 375° C. and a pressure of 100 psig. A biomass-derived waste stream (composition shown in Table 1) comprising light alcohols was fed at a weighted hourly space volume of 3.4/hr. The product was predominantly in the gasoline boiling range. The general molecular size composition and Research Octane Number (RON) of the hydrocarbon product is listed in Table 2.

TABLE 2

| H-ZSM Conversion Product Size Distribution | |
|---|---|
| C1-C4 paraffins (wt. %) | 31.4 |
| C2-C5 olefins (wt. %) | 3.4 |
| C5 or larger (wt. %) | 65.2 |
| Research Octane Number | >95 |

EXAMPLE 3

Conversion of Light Alcohols with Ethylene Co-Feed:

Conversion was performed using the same catalyst as in Example 1. Five grams of H-ZSM5 catalyst was utilized for each run at a temperature of 375° C. and a pressure of 100 psig. The biomass-derived waste stream was co-fed along with either nitrogen alone, or a 1:1 mixture of nitrogen and ethylene. The durene content, calculated motor octane number (MON) and Research Octane Number (RON) of the gasoline-range hydrocarbon product is listed in Table 2. It was observed that co-feeding ethylene cut the during content of the product by nearly 50%, while not significantly affecting the octane rating of the fuel.

TABLE 3

| Durene Concentration in Liquid Hydrocarbon Product | | |
|---|---|---|
| | Biowaste Stream | Biowaste + Ethylene |
| Feed Description | | |
| Biowaste (ml/hr) | 20 | 20 |
| Ethylene (ml/min) | 0 | 25 |
| Nitrogen (ml/min) | 50 | 25 |
| Gasoline Product Composition | | |
| Product Durene Content (wt %) | 8.21 | 4.34 |
| Caclulated MON | 91 | 88 |
| Calculated RON | 103 | 102 |

In closing, it should be noted that the discussion of any reference is not an admission that it is prior art to the present disclosure, in particular, any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. Thus, the invention disclosed herein is specifically intended to be as broad as the claims below and those variations and equivalents that are encompassed by the scope of the claims. The abstract and drawings are intended to be generally descriptive and are not intended to limit the scope of the invention.

We claim:

1. A process for upgrading a feedstream comprising light alcohols to a liquid transportation fuel, comprising:
   a) providing a feedstream comprising at least 70 wt % of mono-functional alcohols having from 1-3 carbons;
   b) reacting the feedstream in the presence of ethylene over a ZSM-5 zeolite catalyst at a temperature and pressure suitable to produce a hydrocarbon product in the gasoline boiling-range comprising at least 60 wt % of compounds comprising at least five carbons and a research octane rating of at least 95, wherein.

2. The process of claim 1, further comprising co-feeding ethylene with the feedstream to a reactor containing the ZSM-5 zeolite catalyst, wherein the ethylene decreases the quantity of durene formed during the reacting.

3. The process of claim 1, wherein the feedstream is a waste stream derived from a process for converting at least one of biomass-derived glycerol and sorbitol to propanediol.

4. The process of claim 1, wherein the reacting occurs at a temperature in the range from 350° C. to 400° C.

5. The process of claim 1, wherein the reacting occurs at a pressure in the range from 75 psig to 150 psig.

* * * * *